(12) United States Patent
Okazaki

(10) Patent No.: US 6,979,259 B2
(45) Date of Patent: Dec. 27, 2005

(54) AIR CONDITIONER

(75) Inventor: Suehiro Okazaki, Kariya (JP)

(73) Assignee: DENSO Corporation, Kariya (JP)

(*) Notice: Subject to any disclaimer, the term of this patent is extended or adjusted under 35 U.S.C. 154(b) by 6 days.

(21) Appl. No.: 10/774,104

(22) Filed: Feb. 6, 2004

(65) Prior Publication Data
US 2004/0154327 A1    Aug. 12, 2004

(30) Foreign Application Priority Data

Feb. 10, 2003    (JP) .............................. 2003-032760

(51) Int. Cl.⁷ .............................................. B60H 1/26
(52) U.S. Cl. ...................................... 454/143; 62/244
(58) Field of Search ........................... 62/244; 165/42, 165/43, 202, 203; 237/12.3 B; 454/143, 454/156

(56) References Cited

U.S. PATENT DOCUMENTS

| | | | | |
|---|---|---|---|---|
| 4,533,081 A | * | 8/1985 | Forsting et al. | 237/12.3 B |
| 4,742,762 A | * | 5/1988 | Ito et al. | 454/160 |
| 4,834,170 A | * | 5/1989 | Sakurada et al. | 165/43 |
| 5,478,274 A | * | 12/1995 | Danieau | 454/126 |
| 6,036,594 A | * | 3/2000 | Kwon et al. | 454/156 |
| 6,045,444 A | * | 4/2000 | Zima et al. | 454/121 |
| 6,536,474 B2 | * | 3/2003 | Akahane | 137/625.44 |
| 6,612,922 B2 | * | 9/2003 | Uemura et al. | 454/121 |
| 6,629,424 B1 | * | 10/2003 | Araki et al. | 62/244 |
| 6,669,548 B2 | * | 12/2003 | Fujiwara | 454/143 |
| 6,799,432 B2 | * | 10/2004 | Nagaya et al. | 62/244 |
| 6,827,141 B2 | * | 12/2004 | Smith et al. | 165/202 |
| 6,857,953 B2 | * | 2/2005 | Malott | 454/100 |

FOREIGN PATENT DOCUMENTS

JP    61-46003    12/1986

\* cited by examiner

Primary Examiner—William E. Tapolcai
(74) Attorney, Agent, or Firm—Harness, Dickey & Pierce, PLC

(57) ABSTRACT

The air conditioning case (11) includes: a right and a left case body (112, 111) made of resin; and a partitioning plate (113) made of metal, and the partitioning plate (113) is a partitioning portion for partitioning the face blowout opening portion (15) and the defroster blowout opening portion (16) which are formed into one opening portion by the right and the left case body (112, 111). Accordingly, compared with the partitioning portion formed integrally with the right and the left case body, no dividing face is formed at the center, and rigidity can be enhanced. Due to the above structure, it is difficult for the partitioning portion to be deformed, and the partitioning portion seldom interferes with the blowout mode door (22).

5 Claims, 4 Drawing Sheets

AIR CONDITIONER

BACKGROUND OF THE INVENTION

1. Field of the Invention

The present invention relates to an air conditioner. More particularly, the present invention relates to an air conditioner having a split-type air conditioning case.

2. Description of the Related Art

There is conventionally provided an air conditioner having an air conditioning case in which a plurality of opening portions, which become air passages, are formed adjacent to each other via a partitioning portion, and a door, which is a movable member for opening and closing the opening portions, is arranged close to the partitioning portion. Further, an air conditioner is known, the air conditioning case of which is of a split-type, in which the air conditioning case is formed by being divided on a dividing face on which a plurality of opening portions and partitioning portions are divided in the direction of arranging the opening portions.

The main portion of an example of the above air conditioner is shown in FIG. 5. The air conditioning case 511 is composed being divided into two pieces, one is a right case 511 and the other is a left case 511b, wherein the air conditioning case 511 is divided on a longitudinally dividing face, and the dividing face passes through the opening portions 515, 516 and the partitioning portion 513. In the air conditioning case 511, the rotary shaft 522b of the door 522 for opening and closing the opening portions 515, 516 is arranged close to the inside of the partitioning portion 513.

However, in the above conventional air conditioner, the following problems may be encountered. As shown in FIG. 5, the right partitioning portion 513a and the left partitioning portion 513b, which compose the partitioning portion 513, protrude from the bodies of the cases 511a, 511b. Accordingly, the partitioning portion 513 tends to be deformed by strain generated in the process of forming. Therefore, it is difficult to obtain a stable profile of the air conditioning case.

The following problems may be encountered in some cases. When the partitioning portion 513 is deformed inside, it interferes with the rotary shaft 522b of the door 522, and the rotary torque necessary for rotating the door 522 is increased. When the partitioning portion 513 is deformed outside, a distance from the partitioning portion 513 to the rotary shaft 522b of the door 522 is increased. Therefore, even if a sealing structure is composed between the partitioning portion 513 and the rotary shaft 522b, the sealing becomes imperfect.

SUMMARY OF THE INVENTION

The present invention has been accomplished in view of the above points. It is an object of the present invention to provide an air conditioner characterized in that a partitioning portion, formed between opening portions, which are adjacent to each other, in an air conditioning case, is difficult to be deformed.

In order to accomplish the above object, according to a first aspect of the present invention, there is provided an air conditioner comprising: an air conditioning case (11); a first opening portion (15) for circulating air flowing in the air conditioning case (11), arranged in the air conditioning case (11); a second opening portion (16) for circulating air flowing in the air conditioning case (11), arranged in the air conditioning case (11) being adjacent to the first opening portion (15) via a partitioning portion (113); and a movable member (22) arranged close to the partitioning portion (113), wherein the air conditioning case (11) is divided into pieces on a dividing face by which the first opening portion (15) and the second opening portion (16) are respectively divided in the arranging direction, the partitioning portion (113) is provided differently from the air conditioning case (11), and one opening portion formed in the air conditioning case (11) is partitioned to two opening portions by the partitioning portion (113) provided differently from the air conditioning case (11) so as to form the first opening portion (15) and the second opening portion (16).

Due to the above structure, the partitioning portion (113) between the first opening portion (15) and the second opening portion (16) is composed of a partitioning member (113) which is different from the case bodies (111, 112). Therefore, it is easy to provide a stable profile.

According to a second aspect of the present invention, there is provided an air conditioner, wherein the case body portions (111, 112) are made of resin material.

Due to the above structure, it is easy to form the case body portion (111, 112) of the air conditioning case (11).

According to a third aspect of the present invention, there is provided an air conditioner, wherein the rigidity of the partitioning member (113) is higher than the rigidity of the case body portions (111, 112).

Due to the above structure, even when the partitioning portion (113) is given an external force, it is difficult for the partitioning portion (113) to be deformed.

According to a fourth aspect of the present invention, there is provided an air conditioner, wherein the partitioning member (113) is made of metallic material.

Due to the above structure, rigidity of the case bodies (111, 112) can be easily enhanced without increasing the size of the partitioning member (113).

According to a fifth aspect of the present invention, there is provided an air conditioner, wherein the movable member (22) is a door member (22) for opening and closing the first opening portion (15) or the second opening portion (16).

Due to the above structure, a movement of the door member (22) is seldom affected by the partitioning member (113).

Incidentally, the reference numerals in parentheses, to denote the above means, are intended to show the relationships between the specific means which will be described later in an embodiment of the invention.

The present invention may be more fully understood from the description of preferred embodiments of the invention set forth below, together with the accompanying drawings.

DESCRIPTION OF PREFERRED EMBODIMENTS

Figure 1:
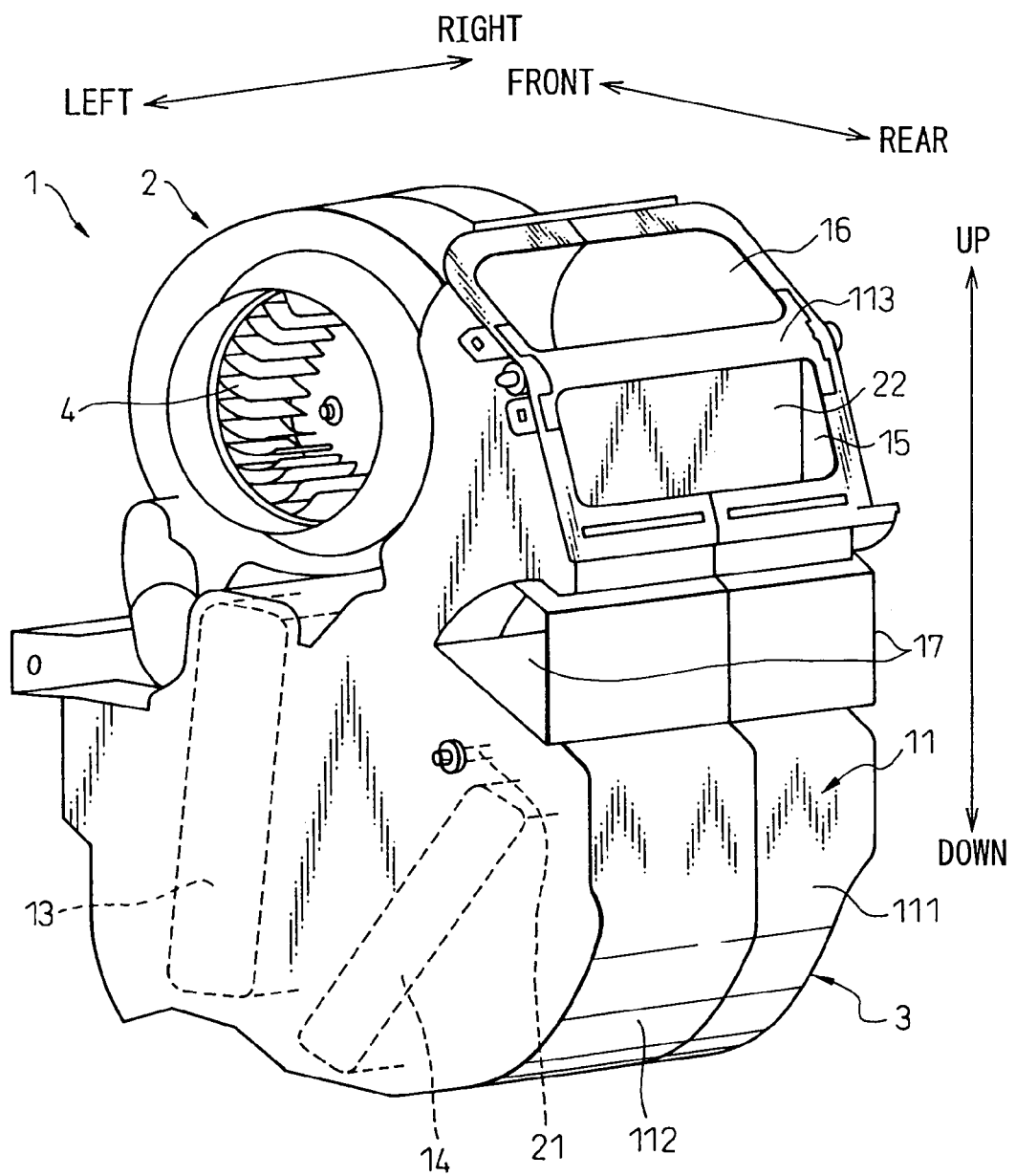
FIG. 1 is a perspective view showing an outline of the structure of the interior unit of the air conditioner for vehicle use of an embodiment of the present invention.
Figure 2:
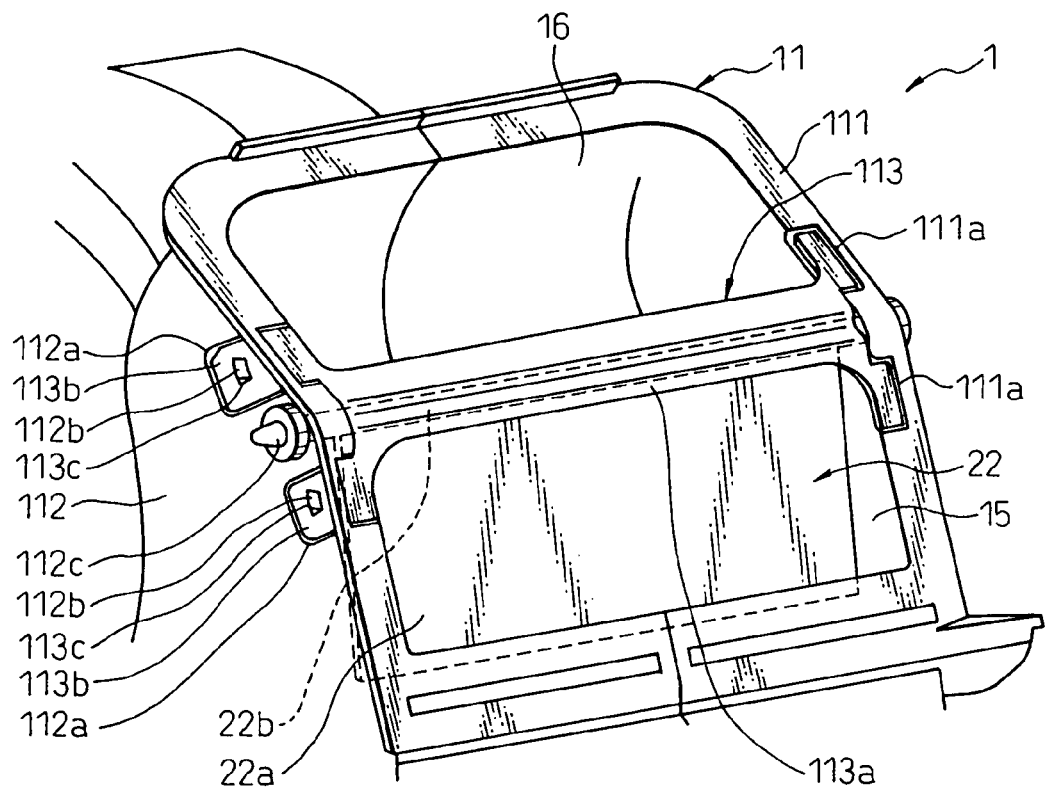
FIG. 2 is a perspective view showing an outline of the interior unit.

Referring to the accompanying drawings, an embodiment of the present invention will be explained below. In this embodiment, the present invention is applied to an air conditioner for vehicle use. FIG. 1 is a perspective view showing an outline of the structure of the interior unit of the air conditioner for vehicle use of an embodiment of the present invention, and FIG. 2 is a perspective view showing an outline of the interior unit.

In the interior unit 1 of the air conditioner for vehicle use, the blower unit portion 2 and the air conditioning portion 3 are integrated with each other into one body. The interior unit 1 is arranged at the central portion of the instrument panel in the vehicle width direction in the front portion of the vehicle compartment wherein the blower unit 2 is set at the front on the upper side of the interior unit 1.

The blower unit 2 has an inside and outside air changeover box (not shown), which is arranged in the left portion of the blower unit 2, for changing over the air inside the vehicle compartment and the air outside the vehicle compartment. In the right portion of this inside and outside air changeover box, the blower is arranged. This blower includes an air blowing fan 4, which is composed of a centrifugal type multiblade fan and a motor (not shown) for driving the fan.

On the other hand, the air conditioning unit 3 includes an air conditioning case 11 composing air passages. This air conditioning case 11 is formed into a substantial box-shape, and the main portion of this air conditioning case 11 is divided into two pieces in the longitudinal direction, that is, this air conditioning case 11 is composed in such a manner that the right case body 111 and left case body 112, which are made of resin (polypropylene in this embodiment), are integrated with each other into one body. In this connection, in this embodiment, the air blowing fan 4 of the blower unit 2 is also accommodated in the air conditioning case 11.

In the air conditioning case 11, an air introducing passage is provided on the front side (on the front side of the lower portion of the air conditioning case 11) of the evaporator 13 arranged under the air blowing fan 4. Air is introduced from the air blowing fan 4 into this air introducing passage. This evaporator 13 is a heat exchanger for refrigerating which is used for cooling air when refrigerant at low pressure evaporates and absorbs heat from air in the refrigerating cycle.

As the evaporator 13 is substantially vertically arranged in the air conditioning case 11, air flowing from the air blowing unit 2 passes through the heat exchanging portion of the evaporator 13 from the front to the rear.

In the air conditioning case 11, the heater core 14 is somewhat obliquely arranged on the downstream side of the air flow sent from the evaporator 13. This heater core 14 is a heat exchanger for heating which is used for heating air while hot water (engine coolant) sent from the engine is being used as a heat source.

On an upper face of the air conditioning case 11, the face blowout opening portion 15, which communicates with a face blowout port (not shown) for blowing out air toward the upper side (toward the head portion of a passenger) in the vehicle room, and the defroster blowout opening portion 16, which communicates with a defroster blowout port (not shown) for blowing out air toward the inner face of the windshield of the vehicle, are provided adjacent to each other. On the side of the air conditioning case 11 on the upper side, the foot blowout opening portion 17, which communicates with a foot blowout port (not shown) for blowing out air toward the feet of a passenger in the vehicle compartment, is provided.

Between the face blowout opening portion 15 and the defroster blowout opening portion 16, the partition plate 113, which is a partitioning member composing a partitioning portion for partitioning both the opening portions 15 and 16, is arranged. The partitioning plate 113 is formed differently from the case body portion which is composed of a right case body 111 and a left case body 112. In this case, the face blowout opening portion 15 is the first opening portion in this embodiment, and the defroster blowout opening portion 16 is the second opening portion in this embodiment.

A plurality of door means (some of them not being shown in the drawing) such as an air mixing door 21, a blowout mode door 22 and so forth are provided in the air conditioning case 11. When these doors are operated, a desired quantity of air, which has passed through the evaporator 13, is heated by the heater core 14 and then blown out from one of the blowout opening portions 15, 16, 17 or from a plurality of the blowout opening portions 15, 16, 17.

Next, the main portion of this embodiment will be explained below. As described before, the face blowout opening portion 15 and the defroster blowout opening portion 16, which are formed on an upper face of the air conditioning case 11, are arranged adjacent to each other while the partitioning plate 113 is used as a partitioning portion as shown in FIG. 2.

Figure 4:
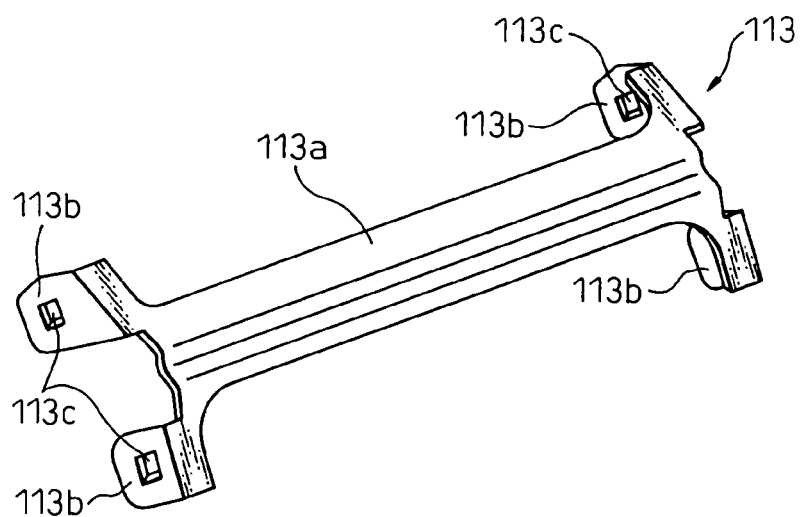
FIG. 4 is a perspective view showing a partitioning plate.

The partitioning plate 113 is a plate member made of metal (aluminum alloy in this embodiment). As shown in FIG. 4, the partitioning plate 113 includes: a main body portion 113a; and four engaging portions 113b arranged at both end portions of the main body portion 113a. The main body portion 113a has a bent structure which extends in the longitudinal direction. The bent structure of the main body portion 113a is used for composing a sealing structure together with the rotary shaft 22b of the blowout mode door 22 described later. Further, the bent structure of the main body portion 113a is used for enhancing rigidity of the main body portion 113a.

The engaging portion 113b is formed extending in a substantially vertical direction with respect to the main body portion 113a. At the substantial center of each engaging portion 113b, the engaging hole 113c is formed as a through-hole. The partitioning plate 113 is formed when a metallic plate, the thickness of which is approximately 1.6 mm, is subjected to press-forming.

Figure 3:
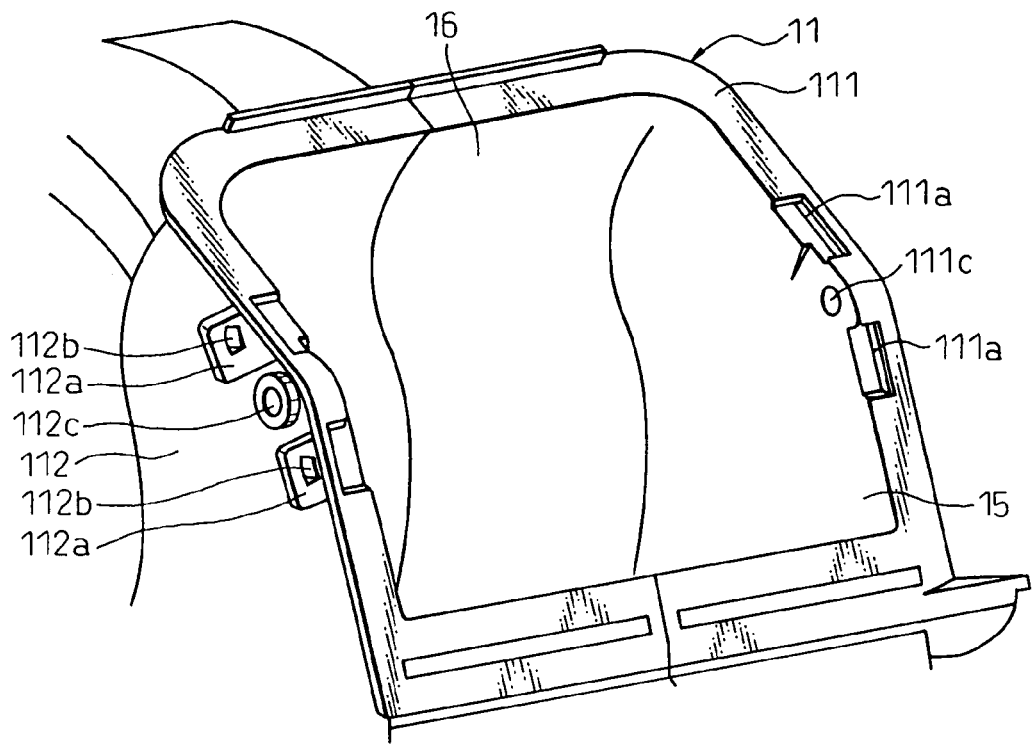
FIG. 3 is a perspective view showing a main portion of the case body of the air conditioning case.

On the other hand, the right case body 111 and the left case body 112, which compose the case body of the air conditioning case 11, are respectively formed into the thickness of about 1.5 mm. As shown in FIG. 3, when the right case body 111 and the left case body 112 are combined with each other so that they can be integrated into one body, the face blowout opening portion 15 and the defroster blowout opening portion 16 are formed into one continuous opening portion. A dividing face of the case body of the air conditioning case 11 (the boundary face of the right case 111 and the left case 112) is a face passing through the center of both the opening portions 15, 16.

On the outer faces of the right case 111 and the left case 112, a plurality of engaging groove portions 111a, 112a, the profiles of which correspond to the engaging portion 113b of the partitioning plate 113, are formed. At the substantial center of each engaging groove portion 111a, 112a, the pawl portion 112b, which is an engaging protrusion for engaging with the engaging hole 113c, is provided. In this case, the pawl portion of the right case body 111 is omitted in the drawing.

In the right case body 111 and the left case body 112, between the engaging groove portions 111a and also between the engaging groove portions 112a, the sliding holes 111c, 112c are respectively formed, into which an end portion of the rotary shaft 22b of the blowout mode door 22 described later are inserted.

As shown in FIG. 2, the blowout mode door 22 includes: a door body portion 22a; and a rotary shaft 22b arranged on one side of the door body portion 22a. Although not shown in the drawing, a sealing member made of elastomer is arranged protruding from the outer circumference of the door body portion 22a and from the side of the rotary shaft 22b opposite to the side on which the door body 22a is arranged.

When the air conditioning unit 1 is assembled, while the evaporator 13, the heater core 14, the air mixing door 21 and the blowout mode door 22 and so forth are accommodated, the right case body 111 and the left case body 112 are combined with each other into one body. At this time, as shown in FIG. 2, end portions of the rotary shaft 22b of the blowout mode door 22 are inserted into the sliding holes 111c, 112c. In FIG. 2, the sliding hole 111c is omitted.

After that, the partitioning plate 113 is attached to the case body. At this time, the engaging portions 113b of the partitioning plate 113 are pushed into the engaging groove portions 111a, 112a of the case bodies 111, 112, and the pawl portions 112b are engaged in the engaging holes 113c. In this way, the partitioning plate 113 can be easily and positively fixed to the case body of the air conditioning unit 1.

The face blowout opening portion 15 and the defroster blowout opening portion 16 are formed into one continuous opening portion in the case body of the air conditioning case 11. In this connection, when the partitioning plate 113 is attached, the face blowout opening portion 15 and the defroster blowout opening portion 16 are partitioned by the main body portion 113a of the partitioning plate 113.

The rotary shaft 22b of the blowout mode door 22 extends in parallel with the longitudinal direction of the main body portion 113a inside the main body portion 113a of the partitioning plate 113. Due to the above structure, the sealing portion described before can positively seal a portion between the rotary shaft 22b and the main body portion 113a.

According to the above structure, the partitioning portion of the face blowout opening portion 15 and the defroster blowout opening portion 16 are composed of a partitioning plate 113 different from the right case body 111 and the left case body 112. Therefore, it is possible to provide a stable profile of the partitioning portion. Accordingly, as the partitioning portion can be arranged at the designed position, it is possible to prevent the occurrence of malfunction which is caused when the partitioning portion (the main body portion 113a) interferes with the rotary shaft 22b of the blowout mode door 22. It is also possible to prevent the occurrence of imperfect sealing between the partitioning portion (the main body portion 113a) and the rotary shaft 22b.

Figure 5:
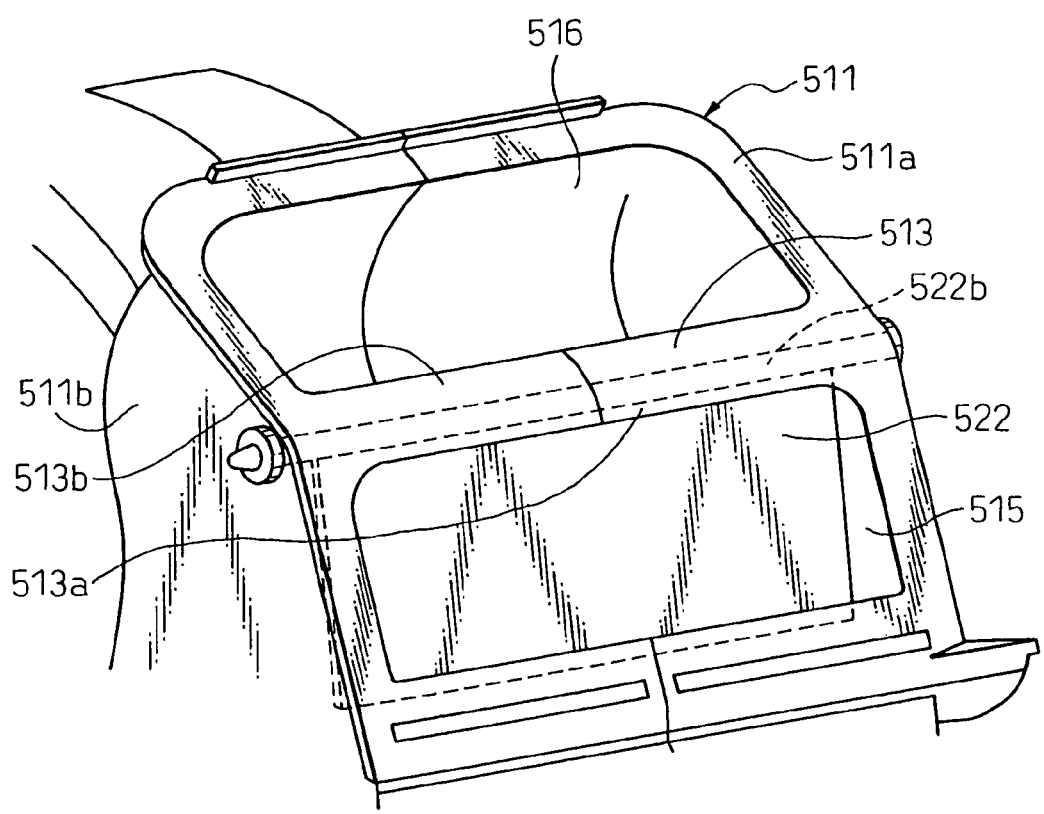
FIG. 5 is a perspective view showing a main portion of the conventional interior unit.

In the conventional air conditioning case shown in FIG. 5, in order to prevent the occurrence of the above problems, highly accurate tuning must be conducted on the metallic molding die, and molding must be executed in a highly accurate molding condition. However, according to the present embodiment, the above highly accurate tuning and molding are not necessary.

As the case body portion (the right and the left case body 112, 111) are made of resin material, they can be easily formed, and further the weight of the air conditioning case 11 can be easily reduced.

The rigidity of the partitioning plate 113 is higher than the rigidity of the case body portion (the right and the left case body 112, 111). Accordingly, in the case where the ventilating ducts are attached to the face blowout opening portion 15 and the defroster blowout opening portion 16, even if the partitioning portion is given stress, the partitioning portion is seldom deformed. Due to the foregoing, it is possible to prevent the main body portion 113a of the partitioning plate 113 from interfering with the rotary shaft 22b.

As the partitioning plate 113 is made of metallic material, even if thickness of the partitioning plate 113 is substantially the same as thickness of the case body portion (the right and the left case body 112, 111), the rigidity of the partitioning plate 113 can be made to be higher than the rigidity of the case body portion. Further, there is no possibility that the size of the air conditioning case 11 must be increased so as to obtain a high rigidity.

Finally, another embodiment will be explained below. In the embodiment described above, the blowout mode door 22, which is a movable member, is a door member having the door main body portion 22a on one side. However, it should be noted that the present invention is not limited above specific embodiment. For example, it is possible to adopt a rotary door, on the opening portion side of which a sealing face is provided. Even if a movable member except for the door member is adopted, the present invention can be effectively applied to the structure.

In the above embodiment, the first and the second opening portion are respectively the face blowout opening portion 15 and the defroster blowout opening portion 16, however, the present invention is not limited to the above specific embodiment. The first or the second opening portion may be a blowout opening portion of the other type. Further, the first or the second opening portion may be a sucking opening portion such as an inside and outside air introducing port. Furthermore, the first and the second opening portion may be an opening portion (ventilating port) provided in the air conditioning case.

In the embodiment described above, the partitioning plate 113 provided differently from the case main body portion is made of metal. However, if it is possible to increase the size of the air conditioning case 11, the partitioning plate 113 may be made of resin material. When the partitioning plate 113 is made of resin material, the weight of the air conditioning case can be easily reduced.

In the embodiment described above, the air conditioner is used for a vehicle. However, it is possible to apply the present invention to an air conditioner used for a house.

While the invention has been described by reference to specific embodiments chosen for purposes of illustration, it should be apparent that numerous modifications could be made thereto by those skilled in the art without departing from the basic concept and scope of the invention.

What is claimed is:

1. An air conditioner comprising:
   an air conditioning case;
   a first opening portion in the air conditioning case for circulating air flowing in the air conditioning case;
   a second opening portion in the air conditioning case for circulating air flowing in the air conditioning case the second opening portion being adjacent to the first opening portion;
   a partitioning portion disposed between the first and second opening portions; and
   a movable member arranged close to the partitioning portion, wherein
   the air conditioning case is divided into pieces on a dividing face by which the first opening portion and the second opening portion are respectively divided; and
   the partitioning portion is provided separately from the air conditioning case, and an opening formed in the air conditioning case is partitioned by the partitioning portion so as to form the first opening portion and the second opening portion.

2. An air conditioner according to claim 1, wherein the air conditioning case is made of resin material.

3. An air conditioner according to claim 1, wherein the rigidity of the partitioning member is higher than the rigidity of the air conditioning case.

4. An air conditioner according to claim 3, wherein the partitioning member is made of metallic material.

5. An air conditioner according to claim 1, wherein the movable member is a door member for opening and closing the first opening portion or the second opening portion.

* * * * *